US010618358B2

(12) United States Patent
Lutz et al.

(10) Patent No.: US 10,618,358 B2
(45) Date of Patent: Apr. 14, 2020

(54) PNEUMATIC VEHICLE TYRE

(71) Applicant: Continental Reifen Deutschland GmbH, Hannover (DE)

(72) Inventors: Andre Lutz, Hannover (DE); Florian Kristen, Hannover (DE)

(73) Assignee: Continental Reifen Deutschland GmbH, Hannover (DE)

(*) Notice: Subject to any disclaimer, the term of this patent is extended or adjusted under 35 U.S.C. 154(b) by 418 days.

(21) Appl. No.: 15/316,175

(22) PCT Filed: Mar. 23, 2015

(86) PCT No.: PCT/EP2015/056031
§ 371 (c)(1),
(2) Date: Dec. 4, 2016

(87) PCT Pub. No.: WO2015/185233
PCT Pub. Date: Dec. 10, 2015

(65) Prior Publication Data
US 2017/0225519 A1 Aug. 10, 2017

(30) Foreign Application Priority Data

Jun. 5, 2014 (DE) .................. 10 2014 210 715

(51) Int. Cl.
*B60C 11/24* (2006.01)
*B60C 11/13* (2006.01)
(Continued)

(52) U.S. Cl.
CPC .......... *B60C 11/24* (2013.01); *B60C 11/0083* (2013.01); *B60C 11/042* (2013.01); *B60C 11/1307* (2013.01); *B60C 2011/1338* (2013.01)

(58) Field of Classification Search
CPC ..... B60C 11/13; B60C 11/24; B60C 11/1307; B60C 11/083; B60C 11/042;
(Continued)

(56) References Cited

U.S. PATENT DOCUMENTS 2,706,509 A * 4/1955 White .................. B60C 11/24
116/208
6,003,576 A * 12/1999 Auxerre ............ B29D 30/0606
152/154.2
2015/0343852 A1* 12/2015 Joza .................... B60C 11/24
152/154.2

FOREIGN PATENT DOCUMENTS

JP 2000-289414 * 10/2000 ............. B60C 11/24
JP 2002-225514 * 8/2002 ............. B60C 11/24
(Continued)

OTHER PUBLICATIONS

JP 2000-289414, English language machine translation [epo.org] (Year: 2000).*

*Primary Examiner* — Eric Hug
(74) *Attorney, Agent, or Firm* — Gregory Adams; David Cate

(57) ABSTRACT

Tread profile of a pneumatic vehicle tyre—in particular for commercial vehicles—comprising a regroovable tread profile with radially raised profile elements (1, 2, 3, 4, 5) and with grooves (6, 7, 8, 9), which respectively separate two adjacent profile elements (1, 2, 3, 4, 5) from one another, wherein the grooves (6, 7, 8, 9) are bounded inwards in the radial direction R by a groove base (10) and on both sides in the axial direction by a profile element flank, forming the groove wall (12, 13), and wherein at least one regrooving indicator (14) for indicating the regrooving depth is respectively formed in one or more grooves (3), characterized in that, in at least one groove (8), all of the regrooving indicators (14) formed therein are formed in a groove wall
(Continued)

Figure 1:
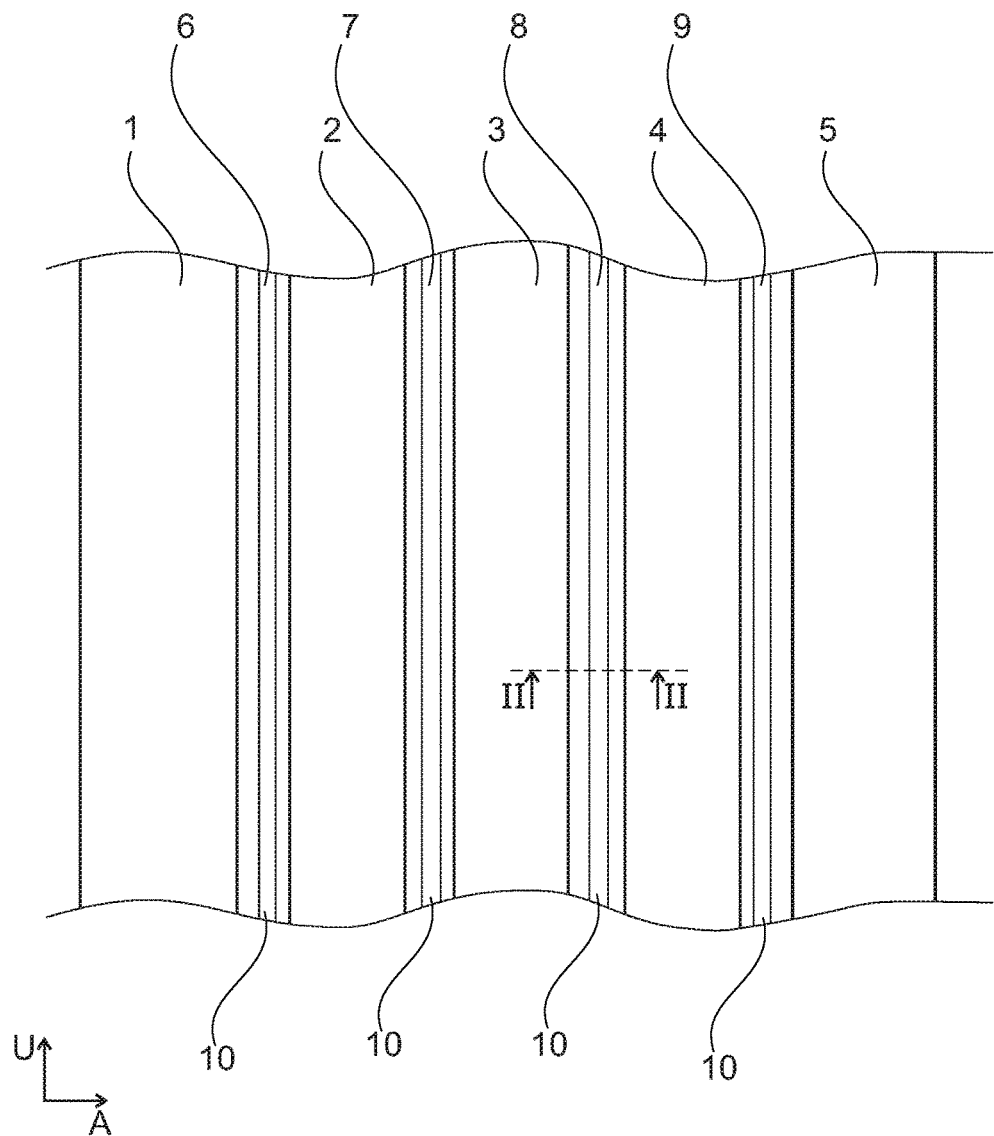

(12) at a height H measured in the radial direction R of H>0 mm above the groove base (10), wherein the height H corresponds to the maximum radial abrasion position of the tyre for regrooving.

19 Claims, 3 Drawing Sheets

(51) Int. Cl.
*B60C 11/04* (2006.01)
*B60C 11/00* (2006.01)

(58) Field of Classification Search
CPC ........... B60C 2011/1338; B60C 11/045; B60C 11/11; B60C 11/246
USPC .......................................... 152/209.21, 154.2
See application file for complete search history.

(56) References Cited

FOREIGN PATENT DOCUMENTS

| KR | 2014-0017393 | * | 2/2014 | ............. B60C 11/24 |
|---|---|---|---|---|
| WO | 2013087473 A1 | | 6/2013 | |

* cited by examiner

PNEUMATIC VEHICLE TYRE

The invention relates to a tread profile of a pneumatic vehicle tire—in particular for utility Vehicles—having a regroovable tread profile with radially elevated profile elements and with grooves which separate in each case two adjacent profile elements from one another, wherein the grooves are delimited inward in a radial direction R by a groove base and to both sides in an axial direction by a profile element flank which forms the groove wall, and wherein in each case at least one regrooving indicator for indicating the regrooving depth is formed in one or more grooves.

It is known for pneumatic vehicle tires to be formed with a tread profile in which radially elevated profile elements are spaced apart from one another by grooves. Here, the tread profiles are formed with a profile depth which is optimized for the respective usage situation. Here, the grooves are, over their major region of extent, formed at a maximum with the maximum profile depth.

In the case of pneumatic utility vehicle tires, it is known for the tread profile to be formed so as to be optimized for the usage situation, including a profile depth which is set in optimized fashion for that purpose. Many utility vehicle tires are formed with circumferential grooves extending over the circumference of the tire and with circumferential ribs separated by said circumferential grooves or with profile block rows extending over the circumference. Here, the relatively wide circumferential grooves are formed with a maximum profile depth over their major region of extent over the circumference of the tire.

In the case of such pneumatic utility vehicle tires, it is furthermore known, in order to lengthen the service life of the tire, for the tread to be formed with an additional material thickness such that, between the belt of the utility vehicle tire and the tire surface, a relatively large amount of rubber material is also formed below the groove base of the circumferential grooves. The profile depth determined for the optimum usage of a new tire is obtained through the formation with the—conventionally—optimized profile with maximum profile depth suitable for the purpose. When the tread profile has been worn down to such an extent that the required minimum profile depth remains, it is possible for such pneumatic utility vehicle tires to be regrooved once again in their tread profile. The regrooving capability is indicated on the utility vehicle tire.

For the user of pneumatic utility vehicle tires, it is important here to identify when the tread profile has been worn down to such an extent that it should, at the latest, be regrooved. Earlier regrooving using the regrooving tools used for the purpose is duly possible, but here, disadvantageous resulting wear of the pneumatic utility vehicle tire is realized. The possible maximum service life of the tire made available by way of the provided rubber material of the tread is thus not utilized. Regrooving performed, using the conventional regrooving blade, at too late a point in time harbors the possibility of poorer tire performance owing to too small a groove depth.

It is known for regrooving indicators to be formed in a groove, which regrooving indicators, when a particular state of wear is reached, indicate to the user that the recommended profile depth at which, at the latest, regrooving should be performed has been reached. The known regrooving indicators are in this case formed in the groove base and extend in a radially outward direction from the groove base. Examples of such regrooving indicators are known from U.S. 2012/0266650A1. Here, the known regrooving indicators, owing to their positioning in the groove base, form obstruction points for the outflow of water, which, specifically in the presence of the progressively reduced profile depth as a result of wear, can have an adverse effect on the wet running characteristics of the pneumatic vehicle tire.

The invention is based on the object of providing, for a user of such vehicle tires, simple indicators in the tread profiles which indicate in a simple manner when the tread profile should, at the latest, be regrooved without the wet grip characteristics of the pneumatic vehicle tire being significantly adversely affected.

The object is achieved according to the invention, through the formation of a tread profile of a pneumatic vehicle tire—in particular for utility vehicles—having a regroovable tread profile with radially elevated profile elements and with grooves which separate in each case two adjacent profile elements from one another, wherein the grooves are delimited inward in a radial direction R by a groove base and to both sides in an axial direction by a profile element flank which forms the groove wall, and wherein in each case at least one regrooving indicator for indicating the regrooving depth is formed in one or more grooves, as per the features of claim 1, wherein, in at least one groove, all of the regrooving indicators formed therein are formed in a groove wall at a height H, measured in the radial direction R, of H>0 mm above the groove base, wherein the height H corresponds to the maximum radial wear position of the tire for the regrooving.

The embodiment with the regrooving indicators in the groove wall at a distance from the groove base furthermore makes it possible to realize a simple visual indication of the attainment of the maximum radial wear position at the height H above the groove base at which, at the latest, the regrooving should be performed. When the profile has worn down to such an extent that the regrooving indicator is no longer visible in the groove wall, said position has been reached, and the tire should be regrooved then at the latest. The formation in the groove wall at a radial distance H from the groove base makes it possible to realize a substantially barrier-free profile of the groove base, and thus that the outflow of water in the groove base region is ensured. The wet running characteristics of the profile can thus also be made possible over the service life of the tire without obstruction of the outflow in the groove base.

The embodiment of a tread profile as per the features of claim 2 is particularly advantageous, wherein, in a groove wall of the groove, one or more elevations, which are arranged one behind the other and so as to be distributed over the circumference of the tire, of the profile element flanks that form the groove wall are formed at a distance H, measured in the radial direction R, of H>0 mm above the groove base, which elevations in each case form a regrooving indicator. In this way, good visibility of the regrooving indicators can be achieved, without impairment of the geometry of the groove.

The embodiment of a tread profile as per the features of claim 3 is particularly advantageous, wherein H is configured such that 1.5 mm≤H≤8 mm. This embodiment is particularly advantageous because, in this way, it can be ensured in a simple manner that regrooving is performed before a recommended minimum profile depth is reached. Thus, after the regrooving, a greater profile depth is provided, whereby it is possible for the tire to be formed with better wet running characteristics again after the regrooving.

The embodiment of a tread profile as per the features of claim 4 is particularly advantageous, wherein the elevation is formed with a maximum elevation c, measured perpendicular to the groove wall, of 0.2 mm≤c≤3 mm and with a maximum extent width B, measured along the radial extent of the elevation in the groove wall proceeding from the distance H from the groove base, of 0.2 mm≤B≤3 mm. In this way, it is possible in a simple manner to realize particularly good visibility, while minimizing the influence on the tire performance.

The embodiment of a tread profile as per the features of claim 5 is particularly advantageous, wherein the elevation is formed as a rib-like elevation which is oriented in a circumferential direction U of the tire and which has a rib width B measured in the groove wall along the radial extent thereof and has a rib height c measured perpendicular to the rib wall.

The embodiment of a tread profile as per the features of claim 6 is particularly advantageous, in which the rib-like elevation is a rib extending over the entire circumference of the tire and thus forms a regrooving indicator extending over the entire circumference of the tire. In this way, it is possible for the recommended regrooving time to be identified easily over the entire circumference of the tire. A movement of the vehicle in order to rotate the tire is not necessary for this purpose.

The embodiment of a tread profile as per the features of claim 7 is particularly advantageous, in which the rib-like elevation is formed as a rib which extends in the circumferential direction U and which has the maximum extent length L, measured in the circumferential direction in the groove wall, of L≥2 mm, in which, over the circumference of the tire in the groove wall, at a distance H from the groove base, a multiplicity of such ribs are formed so as to be distributed one behind the other and arranged spaced apart from one another, which ribs form in each case one regrooving indicator, and in which, in particular, the distance a, measured in the groove wall, between two ribs arranged one behind the other in the circumferential direction U is configured such that 2 mm≤a≤25 mm. By way of this embodiment, owing to the spacing, the indication effect is increased, and the visibility is additionally improved. Furthermore, in the state in which the profile has already worn down significantly, before the regrooving, the traction of the tire can be positively influenced by way of the individual ribs, and the wet running characteristics can be positively influenced by way of the spacing.

The embodiment of a tread profile as per the features of claim 8 is particularly advantageous, wherein the elevation is, at its elevation base in the groove wall, formed with an intersection contour which is oval, elliptical or triangular. In this way, the easy visibility is further improved through the use of simple, visually clearly perceptible elements. Furthermore, this embodiment makes it possible for a recommended time period for the regrooving to be presented in a simple, clearly perceptible way.

The embodiment of a tread profile as per the features of claim 9 is particularly advantageous, wherein the elevation is a linear elevation extending along the groove wall.

The embodiment of a tread profile as per the features of claim 10 is particularly advantageous, wherein the elevation is a linear elevation extending over the entire circumference of the tire.

The embodiment of a tread profile as per the features of claim 11 is particularly advantageous, in which the linear elevation is formed so as to extend in the manner of a circular line concentrically with respect to the tire axis.

The embodiment of a tread profile as per the features of claim 12 is particularly advantageous, in which the linear elevation is formed so as to extend in undulating or meandering fashion along a circular line formed concentrically with respect to the tire axis.

The embodiment of a tread profile as per the features of claim 13 is particularly advantageous, in which the linear elevation forms a V shape along its linear extent, wherein the tip of the V shape points inward in the radial direction R of the tire, and in which, over the circumference of the tire, a multiplicity of such linear elevations are formed so as to be distributed and arranged one behind the other. With progressive wear, the width of the remaining "V" decreases. The embodiment thus makes it additionally possible in a simple manner to realize a clearly visible indication, similar to a countdown, of the approaching point in time of the latest regrooving.

Figure 2:
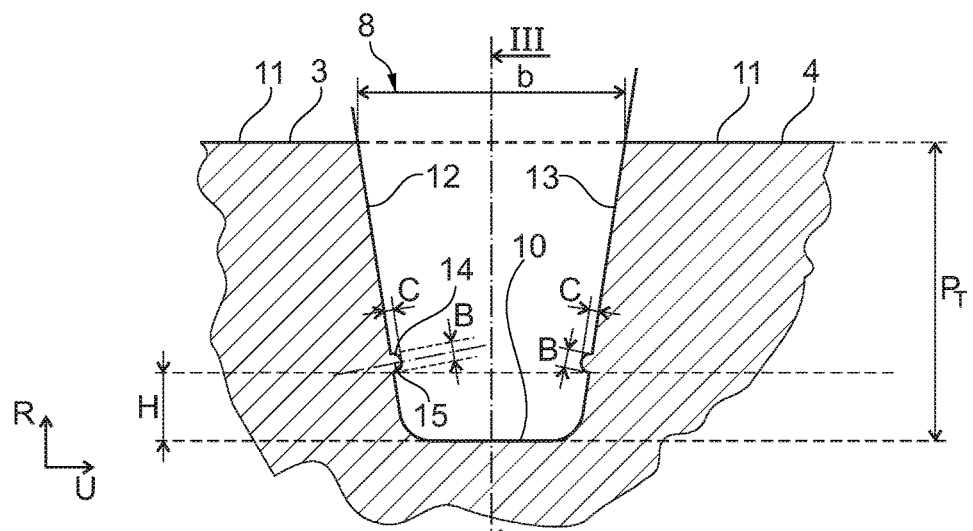
Figure 3:
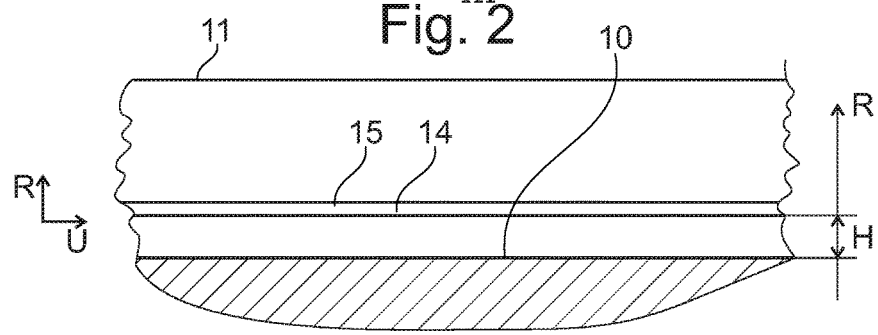
Figure 4:
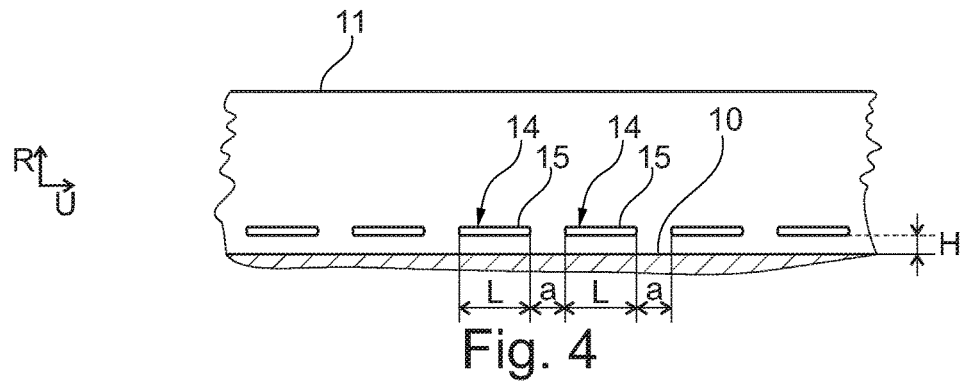
Figure 5:
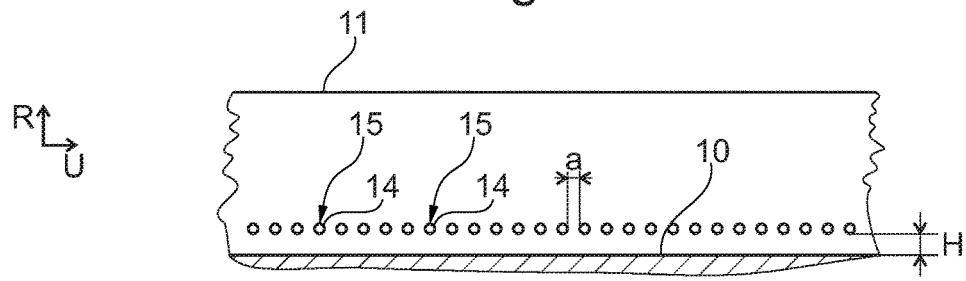
Figure 6:
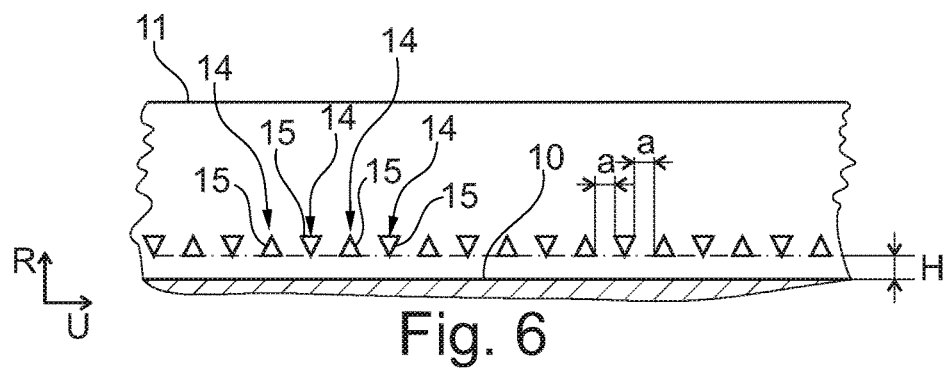
Figure 7:
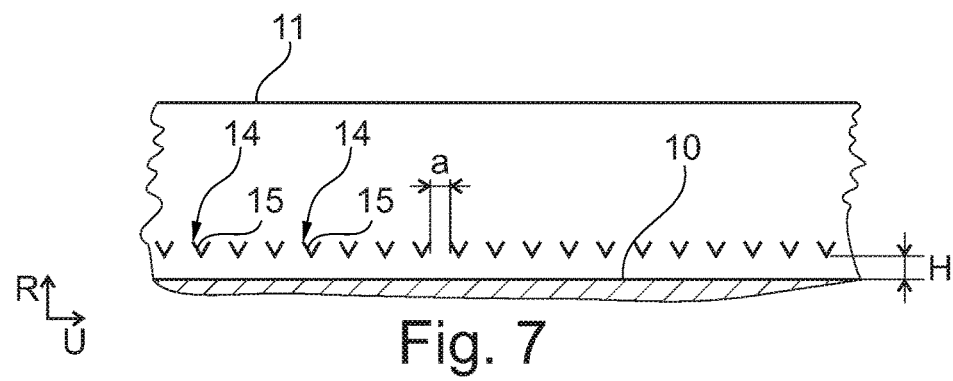
Figure 8:
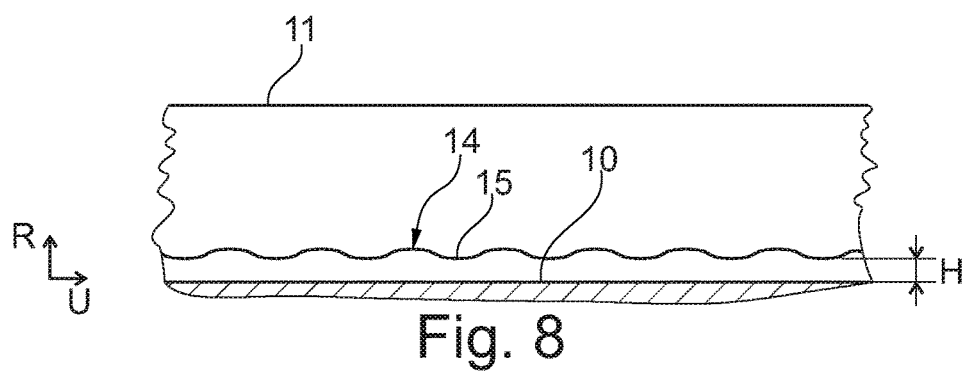
Figure 9:
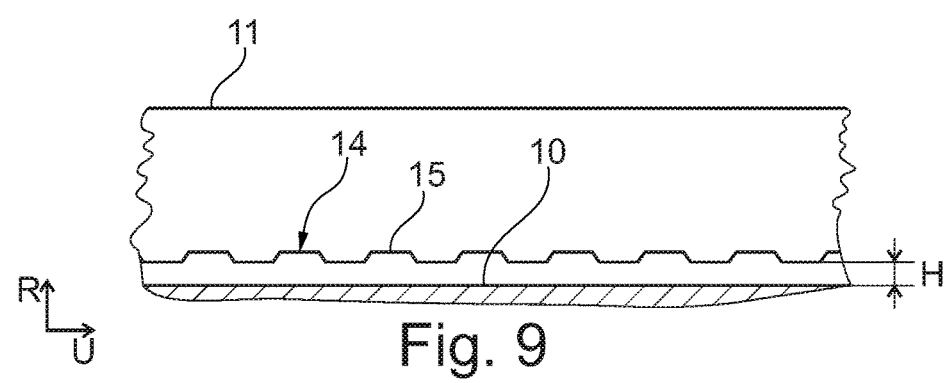

The invention will be discussed in more detail below on the basis of the exemplary embodiments illustrated in FIGS. 1 to 9. In the figures:

FIG. 1 shows a circumferential section of a tread profile of a pneumatic utility vehicle tire in plan view, FIG. 2 is a cross-sectional illustration of a circumferential groove of the tread profile of FIG. 1 in a sectional illustration as per section II-II in FIG. 1 for illustrating the positioning of the regrooving indicator, FIG. 3 shows the circumferential groove of FIG. 2, in a view directed toward a groove wall, in a sectional illustration as per section III-III for explaining an embodiment of the regrooving indicator, FIG. 4 is an illustration analogous to the illustration of FIG. 3, with an alternative form of a regrooving indicator, FIG. 5 is an illustration analogous to the illustration of FIG. 3 for explaining a further alternative embodiment of a regrooving indicator, FIG. 6 is an illustration analogous to the illustration of FIG. 3 for explaining a further alternative embodiment of a regrooving indicator, FIG. 7 is an analogous illustration of FIG. 3 for explaining a further alternative embodiment of a regrooving indicator, FIG. 8 is an analogous illustration of FIG. 3 for explaining a further alternative embodiment of a regrooving indicator, and FIG. 9 is an analogous illustration in relation to FIG. 3 for explaining a further alternative embodiment of a regrooving indicator.

FIGS. 1 to 3 show a tread profile of a pneumatic utility vehicle tire with multiple circumferential ribs 1, 2, 3, 4 and 5 which are arranged adjacent to one another in an axial direction A of the pneumatic vehicle tire and which extend over the entire circumference of the pneumatic vehicle tire and which are oriented in a circumferential direction U. In the exemplary embodiment illustrated in FIG. 1, the circumferential rib 1 forms the left-hand shoulder rib, and the circumferential rib 5 forms the right-hand shoulder rib. The circumferential rib 1 and the circumferential rib 2 are arranged adjacent to one another in the axial direction A and are spaced apart from one another axially by a circumferential groove 6 which extends over the entire circumference of the pneumatic vehicle tire and which is oriented in the circumferential direction U. The circumferential rib 2 and the circumferential rib 3 are arranged adjacent to one another in the axial direction A of the pneumatic vehicle tire and are spaced apart from one another by a circumferential groove 7 which extends over the entire circumference of the pneumatic vehicle tire and which is oriented in the circumferential direction U. The circumferential rib 3 and the circumferential rib 4 are arranged adjacent to one another in the axial direction A and are spaced apart from one another by a circumferential groove 8 which extends over the entire circumference of the pneumatic vehicle tire and which is oriented in the circumferential direction U. The circumferential rib 4 and the circumferential rib 5 are arranged adjacent to one another in the axial direction A of the pneumatic vehicle tire and are spaced apart from one another by a circumferential groove 9 which extends over the entire circumference of the pneumatic vehicle tire and which is oriented in the circumferential direction U.

The circumferential ribs 1, 2, 3, 4 and 5 are delimited toward the outside in the radial direction R of the pneumatic vehicle tire by a radially outer surface 11 which forms the ground contact surface.

The circumferential grooves 6, 7, 8 and 9 are delimited inwardly in the radial direction R of the pneumatic vehicle tire by a groove base 10 which extends over the entire circumference of the pneumatic vehicle tire.

The circumferential grooves 6, 7, 8 and 9 are, to both sides of the groove base 10 in the axial direction A of the pneumatic vehicle tire, delimited in each case by groove walls 12 and 13. The groove base 10 is thus formed axially between the two groove walls 12 and 13.

The circumferential grooves 6, 7, 8 and 9 are in each case formed with a groove width b, measured in the axial direction in the position of the radially outer surface 11 of the adjoining circumferential ribs, of 3 mm≤b≥30 mm.

The further form of the circumferential grooves 6, 7, 8 and 9 will be described below on the basis of the circumferential groove 8 illustrated in FIG. 2. The other circumferential grooves 6, 7 and 9 are of correspondingly analogous form.

As illustrated in FIG. 2 on the basis of the example of the circumferential groove 8, in the section planes that include the tire axis, the groove walls 12 and 13 extend substantially rectilinearly radially outward from the groove base 10 as far as the radially outer surface 11 of the circumferential rib 3 or 4 delimited by the respective groove wall 12 or 13. In the exemplary embodiment of the circumferential groove 8 illustrated in FIG. 2, the groove wall 12 forms that flank of the circumferential rib 3 which is directed toward the circumferential groove 8, and the groove wall 13 forms that flank of the circumferential rib 4 which is directed toward the circumferential groove 8. The circumferential groove 8 is formed with a groove depth $P_T$ which is measured, in each case proceeding from the radially outer surface 11 of the circumferential ribs 3 and 4 at the respective position of intersection thereof with the flanks 12 and 13, inwardly in the radial direction R as far as the lowest point of the groove base 10. The profile depth $P_T$ is configured such that 8 mm≤$P_T$≤36 mm.

In the section plane that encompasses the tire axis, the groove base 10 is of rectilinear form over the major part of its extent.

As illustrated in FIG. 2 and FIG. 3, in the two groove walls 12 and 13, a regrooving indicator 14 is formed in each case at a distance H, measured in the radial direction R, from the groove base 10.

For the sake of simplicity, the further description and explanation of the regrooving indicator 14 will hereinafter be discussed in more detail only with reference to the embodiment of the regrooving indicator 14 on the groove wall 12. A correspondingly formed regrooving indicator 14 is analogously also formed in the groove wall 13. In another embodiment, the regrooving indicator 14 is formed in each case only in the groove wall 12.

The regrooving indicator 14 is in the form of an elevation 15 in the groove wall 12. Here, proceeding from that rib flank of the circumferential rib 3 which forms the groove wall 12, which rib flank extends substantially rectilinearly in the sectional illustrations that encompasses the tire axis, the elevation 15 is formed so as to extend into the circumferential groove 8 with an elevation height c, measured perpendicular to the groove wall 12, of 0.2 mm≤c≤3 mm.

In the exemplary embodiment illustrated, as can be seen in FIG. 2 and FIG. 3, the elevation 15 is in the form of a fine rib 15 which extends over the entire circumference of the pneumatic vehicle tire. The rib 15 is formed with a rib height c measured perpendicular to the groove wall 12 and with a rib width B, measured along the groove wall 12 in the groove wall 12 radially outward from the groove base 10, of 0.2 mm≤B≤5 mm. The rib 15 extends, in its longitudinal extent, in the circumferential direction U over the entire circumference of the pneumatic vehicle tire and, in so doing, forms a linear elevation, formed concentrically with respect to the tire axis, at a radial distance H from the groove base 10.

Here, the spacing H is selected so as to correspond to the radial position of the circumferential groove 8 at which—when the tread profile has worn down to said radial position—the circumferential groove 8 should, at the latest, be regrooved. The elevation 15 in the form of a rib thus forms a regrooving indicator 14. For as long as the rib 15 and thus the regrooving indicator 14 are visible to the user, regrooving is duly possible but is not yet necessary. When the tread profile has worn down to such an extent that, as a result of the wear, the elevation 15 in the form of a rib and thus the regrooving indicator 14 are no longer visible, regrooving should be performed without delay.

FIG. 4 shows an alternative embodiment in which rib-like elevations 15 of said type with a limited extent length L, formed in the circumferential direction U, of L≥2 mm are arranged one behind the other in the circumferential direction U of the pneumatic vehicle tire. Here, a multiplicity of such rib-like elevations 15 are arranged so as to be distributed over the circumference of the pneumatic vehicle tire. In each case two rib-like elevations 15 arranged one behind the other are in this case arranged at a distance a from one another of 2 mm≤a≤25 mm—for example a=5 mm—in the groove wall 12. The rib-like elevations arranged one behind the other in the circumferential direction U are in this case formed in each case so as to be arranged at a distance H from the groove base in the radial direction R, and form in each case one regrooving indicator 14. When the regrooving indicators 14 have disappeared as a result of wear, it is at that point, at the latest, that the circumferential groove 8 should be regrooved.

FIG. 5 shows a further exemplary embodiment, in which the elevations 15 arranged one behind the other in the circumferential direction U form, at their elevation base, an intersection contour with the groove wall 12 which is circular, elliptical or oval. The elevations 15 arranged one behind the other in the circumferential direction U are, in the exemplary embodiment of FIG. 4, arranged in each case at a distance a from one another, and form in each case one regrooving indicator 14.

FIG. 6 shows a further alternative embodiment of such elevations 15 which are distributed over the circumference of the pneumatic vehicle tire and arranged one behind the other and which form in each case one regrooving indicator 14. In this embodiment, the elevations 15, at their elevation base in the groove wall 12, form in each case a triangular intersection contour with the groove wall 12. In one embodiment, the triangles are in this case in each case oriented with a triangle tip inward in the radial direction R, and end inwardly in the radial direction at said tip at the distance H, measured in the radial direction, from the groove base 10. In another embodiment, the triangles are in each case arranged with a tip pointing outward in the radial direction R. That triangle side of said triangles which is situated opposite said tip is arranged at the distance H, measured in the radial direction, from the groove base 10. In a further embodiment illustrated in FIG. 6, radial elevations 15 whose triangle tips are oriented inward in the radial direction R and radial elevations 15 whose triangle tips are oriented outward in the radial direction R are arranged one behind the other in an alternating sequence over the circumference of the tire.

The embodiment of FIG. 3 with the formation of one rib-like elevation 15 shows in this case a linear elevation which extends, concentrically with respect to the tire axis, over the entire circumference of the pneumatic vehicle tire.

FIG. 8 shows an alternative embodiment in which the linear form extends in undulating fashion over the entire circumference along a circular line formed concentrically with respect to the tire axis, wherein undulation troughs, which are directed inward in the radial direction R, are formed with their extreme value (minimum) at a distance H, measured in the radial direction R, from the groove base 10. In this embodiment, too, by way of the elevation 15 that forms the regrooving indicator 14, a visual indication is thus provided to the effect that, when the elevation 15 and thus the regrooving indicator 14 completely disappear, the state in which, at the latest, regrooving should be performed has been reached.

FIG. 9 shows a further exemplary embodiment in which the linear form is formed so as to run in meandering fashion along a circular line formed concentrically with respect to the tire axis, wherein in this case, too, the radial low points of the elevation 15, which repeat over the circumference of the pneumatic vehicle tire, are formed in each case at a radial distance H from the groove base 10. The elevations 15, as regrooving indicators 14, thus indicate, when the radial elevations 15 and thus the regrooving indicator 14 completely disappear, that the state in which, at the latest, regrooving should be performed has been reached.

FIG. 4 shows an embodiment in which the linear elevations 15 are formed so as to be distributed in the form of ribs over the circumference of the pneumatic vehicle tire, in each case at a distance a from one another. Here, the linear elevations 15 are in each case oriented so as to extend in the circumferential direction U of the pneumatic vehicle tire.

FIG. 7 shows an alternative exemplary embodiment in which the linear elevations 15, which are distributed over the circumference and arranged one behind the other in the circumferential direction U, are in each case of V-shaped form in terms of their profile, wherein the tip of the V points inward in the radial direction R of the pneumatic vehicle tire and is formed at the radial distance H from the groove base 10. In this exemplary embodiment, too, elevations that are adjacent in the circumferential direction U are arranged in each case at the distance a from one another. In this exemplary embodiment, too, the elevations 15 form regrooving indicators 14. When the elevations 15 with the tip of the V shape disappear, the latest point in time for regrooving has been reached.

The distance H is, in a manner dependent on the respective profile of the utility vehicle tire and on the additional rubber thickness provided for the regrooving, configured such that 1.5 mm≤H≤8 mm.

LIST OF REFERENCE SIGNS

Part of the Description

1 Circumferential rib
2 Circumferential rib
3 Circumferential rib
4 Circumferential rib
5 Circumferential rib
6 Circumferential groove
7 Circumferential groove
8 Circumferential groove
9 Circumferential groove
10 Groove base
11 Radially outer surface
12 Groove wall
13 Groove wall
14 Regrooving indicator
15 Elevation

The invention claimed is:

1. A tread profile of a pneumatic vehicle tire, the tread profile comprising a regroovable tread profile with radially elevated profile elements, and one or more grooves which separate adjacent profile elements from one another;
   wherein the one or more grooves extend inward in a radial direction R to a groove base;
   wherein each of the one or more grooves are limited in an axial direction by a profile element flank which forms a groove wall;
   wherein in each case at least one regrooving indicator for indicating a regrooving depth is formed in the one or more grooves and the at least one regrooving indicator indicates when regrooving is to occur;
   wherein, in at least one the one or more grooves, all of the regrooving indicators formed therein are formed in the groove wall at a height H measured in the radial direction R which is greater than 0 mm above the groove base; and,
   wherein the height H corresponds to a maximum radial wear position of the tire for regrooving;
   wherein each of the at least one regrooving indicator is an elevation, and wherein the elevation is a linear elevation extending along the groove wall.

2. The tread profile as claimed in claim 1, wherein the groove wall of the at least one or more grooves comprises two or more elevations arranged one behind the other, wherein the two or more elevations are distributed over the circumference of the tire on the profile element flanks that form the groove wall, wherein the two or more elevations are formed at a distance H measured in the radial direction R which is greater than 0 mm above the groove base, and wherein the two or more elevations form the at least one regrooving indicator.

3. The tread profile as claimed in claim 1, wherein 1.5 mm≤H≤8 mm above the groove base.

4. The tread profile as claimed in claim 1, wherein each of the at least one regrooving indicator is an elevation formed with a maximum elevation C, measured perpendicular to the groove wall, of 0.2 mm≤C≤3 mm and with a maximum extent width B, measured along the radial extent of the elevation in the groove wall proceeding from the distance H from the groove base of 0.2 mm≤B≤3 mm.

5. The tread profile as claimed in claim 1, wherein each of the at least one regrooving indicator is an elevation, wherein the elevation is a rib-like elevation oriented in a circumferential direction U of the tire, and wherein the rib-like elevation has a rib width B measured in the groove wall along the radial extent thereof and a rib height C measured perpendicular to the rib wall.

6. The tread profile as claimed in claim 5, wherein the rib-like elevation is a rib extending over the entire circumference of the tire, thus forming a regrooving indicator extending over the entire of the tire.

7. The tread profile as claimed in claim 5, wherein the rib-like elevation is a plurality of ribs which extends in the circumferential direction U and which has the maximum extent length L, measured in the circumferential direction in the groove wall, of L≥2 mm;
  wherein over the circumference of the tire in the groove wall, at a distance H from the groove base, a the plurality of ribs are formed so as to be distributed one behind the other and arranged spaced apart from one another;
  wherein the plurality of ribs form in each case one regrooving indicator; and,
  wherein the distance a, measured in the groove wall between two of the plurality of ribs, is 2 mm≤a≤25 mm.

8. The tread profile as claimed in claim 1, wherein each of the at least one regrooving indicator is an elevation, and wherein the elevation is, at its elevation base in the groove wall, formed with an intersection contour which is oval, elliptical or triangular.

9. The tread profile as claimed in claim 1, wherein the elevation is a linear elevation extending over the entire circumference of the tire.

10. The tread profile as claimed in claim 1, wherein the linear elevation is formed so as to extend in the manner of a circular line concentrically with respect to the tire axis.

11. The tread profile as claimed in claim 1, wherein the linear elevation is formed so as to extend in undulating or meandering fashion along a circular line formed concentrically with respect to the tire axis.

12. The tread profile as claimed in claim 1, wherein the linear elevation forms a V shape along its linear extent, wherein the tip of the V shape points inward in the radial direction R of the tire, and wherein, over the circumference of the tire.

13. The tread profile as claimed in claim 12, wherein the linear elevation is one a plurality of linear elevations distributed and arranged one behind the other.

14. The tread profile as claimed in claim 1, wherein the pneumatic vehicle tire is a utility vehicle tire.

15. The tread profile as claimed in claim 1, wherein the at least on regrooving indicator provides a first indication that the groove should be regrooved and a second indication that the groove needs to be regrooved.

16. A pneumatic vehicle tire defining a regroovable tread profile, the regroovable tread profile comprising radially elevated profile elements, and one or more grooves which separate adjacent profile elements from one another;
  wherein the one or more grooves extend inward in a radial direction R to a groove base;
  wherein each of the one or more grooves are limited in an axial direction by a profile element flank which forms a groove wall;
  wherein in each case at least one elevation for indicating a regrooving depth is formed in the one or more grooves;
  wherein, in at least one the one or more grooves, all of the elevations formed therein are formed in the groove wall; and,
  wherein the elevation corresponds to a maximum radial wear position of the tire for regrooving.

17. The pneumatic vehicle tire as claimed in claim 16, wherein the elevation is a rib-like elevation oriented in a circumferential direction U of the tire, and wherein the rib-like elevation has a rib width B measured in the groove wall along the radial extent thereof and a rib height C measured perpendicular to the rib wall.

18. The pneumatic vehicle tire as claimed in claim 17, wherein the rib-like elevation is a rib extending over the entire circumference of the tire, thus forming a regrooving indicator extending over the entire of the tire.

19. A pneumatic vehicle tire defining a regroovable tread profile, the regroovable tread profile comprising radially elevated profile elements, and one or more grooves which separate adjacent profile elements from one another;
  wherein the one or more grooves extend inward in a radial direction R to a groove base;
  wherein each of the one or more grooves are limited in an axial direction by a profile element flank which forms a groove wall;
  wherein in each case at least one elevation is formed in the one or more grooves;
  wherein in at least one the one or more grooves, all of the elevations formed therein are formed in the groove wall; and,
  wherein, in at least one the one or more grooves, all of the elevations formed therein are formed in the groove wall at a height H, measured in the radial direction R, which is 1.5 mm≤H≤8 mm above the groove base.

* * * * *